United States Patent
Bekkevold et al.

(10) Patent No.: US 6,742,963 B2
(45) Date of Patent: Jun. 1, 2004

(54) METHOD FOR CONNECTION OF UNDERWATER PIPELINES AND A TOOL FOR SUCH CONNECTION

(75) Inventors: Knut Håvard Bekkevold, Hof (NO); Finn G. Haugen, Notodden (NO); Per Stordalen, Kongsberg (NO); Jon Thoresen, Kongsberg (NO)

(73) Assignee: FMC Kongsberg Subsea AS, Kongsberg (NO)

( * ) Notice: Subject to any disclaimer, the term of this patent is extended or adjusted under 35 U.S.C. 154(b) by 0 days.

(21) Appl. No.: 10/258,018

(22) PCT Filed: Apr. 18, 2001

(86) PCT No.: PCT/NO01/00166
§ 371 (c)(1),
(2), (4) Date: Oct. 18, 2002

(87) PCT Pub. No.: WO01/79736
PCT Pub. Date: Oct. 25, 2001

(65) Prior Publication Data
US 2003/0049076 A1 Mar. 13, 2003

(30) Foreign Application Priority Data
Apr. 18, 2000 (NO) ............................................. 20002065

(51) Int. Cl.$^7$ .................... F16L 1/00; F16L 1/028
(52) U.S. Cl. ................................... 405/170; 405/158
(58) Field of Search .............................. 405/166, 158, 405/169, 170, 190, 191; 166/343

(56) References Cited

U.S. PATENT DOCUMENTS

| | | | |
|---|---|---|---|
| 5,320,175 A | | 6/1994 | Ritter et al. |
| 5,593,249 A | | 1/1997 | Cox et al. |
| 5,975,803 A | * | 11/1999 | Mackinnon ................. 405/169 |
| 6,024,514 A | | 2/2000 | Ostergaard |
| 6,227,765 B1 | | 5/2001 | von Trepka |
| 6,234,717 B1 | * | 5/2001 | Corbetta ..................... 405/170 |

FOREIGN PATENT DOCUMENTS

| | | |
|---|---|---|
| GB | 2 323 907 A | 10/1998 |
| NO | 303914 B1 | 9/1998 |
| NO | 305411 | 5/1999 |
| NO | 305815 | 7/1999 |
| NO | 306273 | 10/1999 |
| NO | 307147 | 2/2000 |
| NO | 308381 | 9/2000 |
| WO | 97/47856 | 12/1997 |

* cited by examiner

*Primary Examiner*—Heather Shackelford
*Assistant Examiner*—Lisa M. Saldano
(74) *Attorney, Agent, or Firm*—Young & Thompson

(57) ABSTRACT

A tool (1') for pulling an end of a first pipe (102) towards a stationary, second pipe (101) includes gripping devices (47) for holding the first pipe (102), and winch devices (140) for pulling the tool with the pipe towards the stationary pipe (101). A collar (50) which is releasable attached to the stationary pipe, has an anchoring point (60,61) for the pull-in line (141). When the tool with the end of the first pipe approaches the stationary pipe, a moment arm (149) on the tool interfaces with a stop (65,66) on the collar. At the same time, an alignment and stroking actuator (110) grips the collar above the axis of the stationary pipe. The moment arm and alignment actuator cooperate to raise the first pipe into a horizontal position so that it is aligned with the stationary pipe.

12 Claims, 8 Drawing Sheets

METHOD FOR CONNECTION OF UNDERWATER PIPELINES AND A TOOL FOR SUCH CONNECTION

BACKGROUND OF THE INVENTION

The present invention relates to a method for connection of underwater pipelines and a tool for such connection.

DESCRIPTION OF THE RELATED ART

Underwater conduits extending between various structures on the seabed to a floating production unit are produced in two ways. When the pipeline is a flowline for production of oil or gas, or an umbilical containing a number of conduits for checking production on the seabed, it normally extends between a manifold and the production unit. Such a pipeline may be up to several kilometres long.

Such pipelines are generally deployed on the seabed in advance independently of other equipment. When the line has to be connected to the bottom structure, its end point has to be drawn or pulled from its deployed position over to the bottom structure and the end of the pipe with the termination head is connected to a corresponding coupling head mounted on the structure.

Another type of pipeline extends between two installations on the seabed, where the installations may be wells, a manifold, a second pipeline or a branch of such a second pipeline, a so-called tee joint. The installations are located at a relatively short distance from one another, usually 20–60 metres. This type of pipeline (which is called a spool or spool piece) is fabricated on the spot in exact lengths based on measurements of the distance between the connection points, and is lowered and connected in one operation.

A common method for this type of connection is a so-called "stab & hinge" where the spool piece is equipped with a hinge and is lowered vertically before being rotated into a horizontal position, see, for example, NO 308381.

A tool for the first type of operation is described in NO 303914. A tool frame is attached to an underwater vehicle, a so-called ROV (Remotely Operated Vehicle). The frame comprises gripping bodies for gripping and holding a pipe, together with winches for pulling the frame with a secured pipe to a connecting point. Pulling lines from the winch are attached in suitable holders mounted on the coupling head, whereupon the ROV with the tool move to the end of the pipe which is lying on the seabed some distance from the template (while the winches pay out wire). The tool is locked to the end of the pipe, whereupon the winches are started, thereby causing the tool with the secured pipe end to be pulled in towards the coupling head.

The winches are preferably individually controllable, with the result that angular deviations in the horizontal plane are adjusted during the pull-in operation, thus enabling the end of the pipe, when it is pulled in, to be axially aligned with the coupling head. The connecting point, however, is located some distance, usually 2–3 metres, above the seabed and it is therefore difficult to adjust the angular deviations in the vertical plane which are created when the pipeline has to be raised from the seabed.

A disadvantage of this type of tool is that, in order to obtain a tie-in, only small deviations, usually less than 4°, are permitted, and this can be difficult to achieve, particularly in the vertical plane.

One way of solving this problem has been to manufacture the coupling head with a downwardly directed bend or a ramp to make it easier to overcome the difference in height. The disadvantage is that it complicates standardisation and leads to increased costs.

A need therefore exists for a pull-in tool which can permit greater angular deviation during pull-in and which is capable of compensating for these deviations and adjusting the termination head so that it is correctly aligned with the coupling head.

SUMMARY OF THE INVENTION

An object of the present invention is therefore to provide a connection tool which can cope with greater vertical angular deviations during pull-in.

A second object of the invention is to provide a connection tool which can make connections more cheaply and quickly.

The tool according to the present invention is suitable for connection of pipelines to coupling heads on bottom or seabed frames or installations or to tee joints in other pipelines, as well as for connection of umbilicals.

BRIEF DESCRIPTION OF THE DRAWINGS

The invention will be described in more detail with reference to the drawing which schematically illustrates embodiments of the tool according to the invention.

DESCRIPTION OF THE PREFERRED EMBODIMENTS

Figures 1, 2, 3:
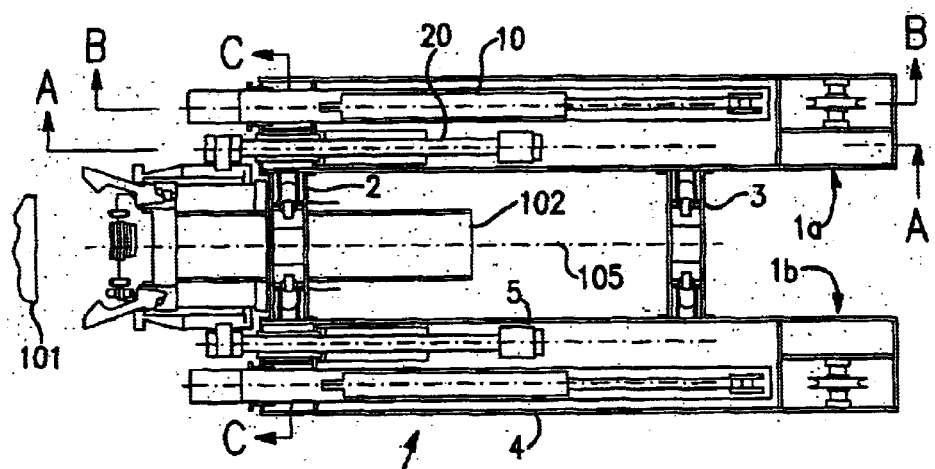
FIG. 1 is a top view of the tool.
FIG. 2 is a section along line A—A in FIG. 1.
FIG. 3 is a section along line B—B in FIG. 1.

In the following, the term "front end" should be understood to refer to the end facing the left in FIG. 1, which forms the portion of the tool which has to be placed closest to the coupling head on a template.

The tool 1 consists of two identical frame halves 1a and 1b mounted at a distance apart, with intermediate distance pieces or bridges 2, 3. In the following, only one of the frame halves will be described on the understanding that the two halves are identical, but mirror images of each other. The means which form part of the frame half 1a thus also form part of frame half 1b.

The frame 1b is in the form of a closed, polygonal, preferably parallelepiped body, but may also be cylindrical in shape. It consists of outer 4 and inner 5 lateral edges, lower 6 and upper 7 lateral edges, and front 8 and rear 9 ends. The latter may advantageously be box-like hollow structures.

The inner space of the frame, which is not filled with anything else, may advantageously be filled with a buoyancy material in order to reduce the weight of the tool in water.

As schematically illustrated in FIG. 1, the tool is arranged to grip a termination head 102 of a flowline or the like, which by means of the tool has to be connected to a coupling head 100 (FIG. 2) which is a part of a second pipe, which, for example, is connected to a Christmas tree for an underwater well for production of oil or gas.

In the frame are mounted a number of hydraulic actuators for performing the functions of the tool. A first actuator 10, which in the preferred embodiment is a pair of piston and cylinder devices, is mounted symmetrically about a vertical plane through the section line B—B, see FIG. 3. The ends of the cylinders 11, 12 are attached to the end of the frame 8 by flexible joints 11a, 11b. The associated piston rods 13, 14 extend from the cylinders and are linked together in a crosshead 15.

In the centre of the symmetry axis of the said plane extends a hollow rod 16. Its rear end is connected to the said crosshead 15 and slides in an opening 17 in the end of the frame 8. When the pistons are activated to be pushed into the cylinder, the rod 15 will thereby be extended through the opening 17 in front of the frame.

The said actuator is a combined alignment and pull-in actuator, thus enabling the tool together with a pipe which is secured by the tool to be moved relative to a seabed installation, as will be explained in greater detail below.

A second actuator 20 is provided in a second vertical plane through the intersecting line A—A in FIG. 1, i.e. on the inside of, or nearer the centre axis, of the frame relative to the first actuator, see FIG. 2. In the preferred embodiment the actuator consists of a piston and cylinder device with a cylinder 21, one end 22 of which is attached to the end 8 of the frame. The piston rod 23 which extends from the cylinder 22 is attached at its other end to a crosshead 24.

Two rigid rods 25, 26 mounted on each side of the cylinder, are attached by their rear ends to the crosshead 24 and can slide in a forcibly guided manner through openings 27, 28 in the end 8 of the frame. At their front ends the rods have connecting pieces 29, 30. Through the connecting pieces there extends a cross bar 31. The bar 31 connects the two actuator rods 25, 26, with the result that they form a controlled or enforced guide. The bar 31 is arranged to engage with a locking sleeve 33 for a connection.

The cross bar 31 is loosely mounted in a groove 34 in the locking sleeve 33 (see also FIG. 11), thus permitting the parts to be released from one another. The cross bar 31 may be fixed to the locking sleeve 33 and instead releasably mounted in the connecting pieces 29, 30.

In the embodiment this connector is a type of finger connector or coupling where a number of fingers 35, which are mounted circumferentially round the female part of the connector, are arranged to be pivoted about an axis. When the piston rod 23 is retracted into the cylinder 21, the rods 25, 26 will drive the locking housing forwards via the connection which comprises the connecting pieces 29, 30 and the cross bar 31, thereby in turn pressing the fingers about the axis inwards to engage round a flange 101 on the coupling head 100. Reference is mad to NO 157432 for a more detailed description of this type of connector.

On the rear end 9 of the frame is mounted a hydraulic winch 40. Via a pulley 42 mounted in the rear part 9 of the frame, a line or wire 41 belonging to the winch is passed through the hollow rod 16. The end of the wire is attached to a locking device 18 which will be described in greater detail below.

The actuator rods 16 and the wires 41 which are located in each frame half 1a, 1b, together with the centre axis 105 for the pipes 102, 103 (i.e. the connector), are located in a first horizontal plane 120.

Figure 4:
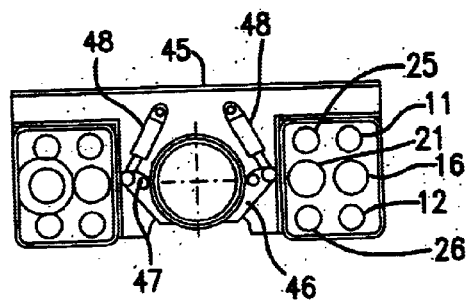
FIG. 4 is a section along line C—C in FIG. 1.

On the underside of the frame there are mounted moment or support arms 49. These are located in a second horizontal plane 130. The function of the moment arms will be described in more detail below. The distance pieces 2, 3 interconnect the two frame halves 1a, 1b. They may consist of a beam 45 (FIGS. 3 and 4) which is attached to the top 7 of the frame parts 1a, 1b. The beam may consist of two telescopic parts (not shown), thus enabling the distance between the frame halves to be varied in order to permit their adaptation to different pipe diameters. As illustrated in FIG. 4, in the distance piece there is provided a pipe gripping device. This consists of two arms 46 which are pivotable around pins 47 in order to close round the pipe, thus enabling the pipe to be lifted and carried by the tool 1. The arms are guided into or out of engagement by means of actuators 48 attached to the beam.

Figure 5:
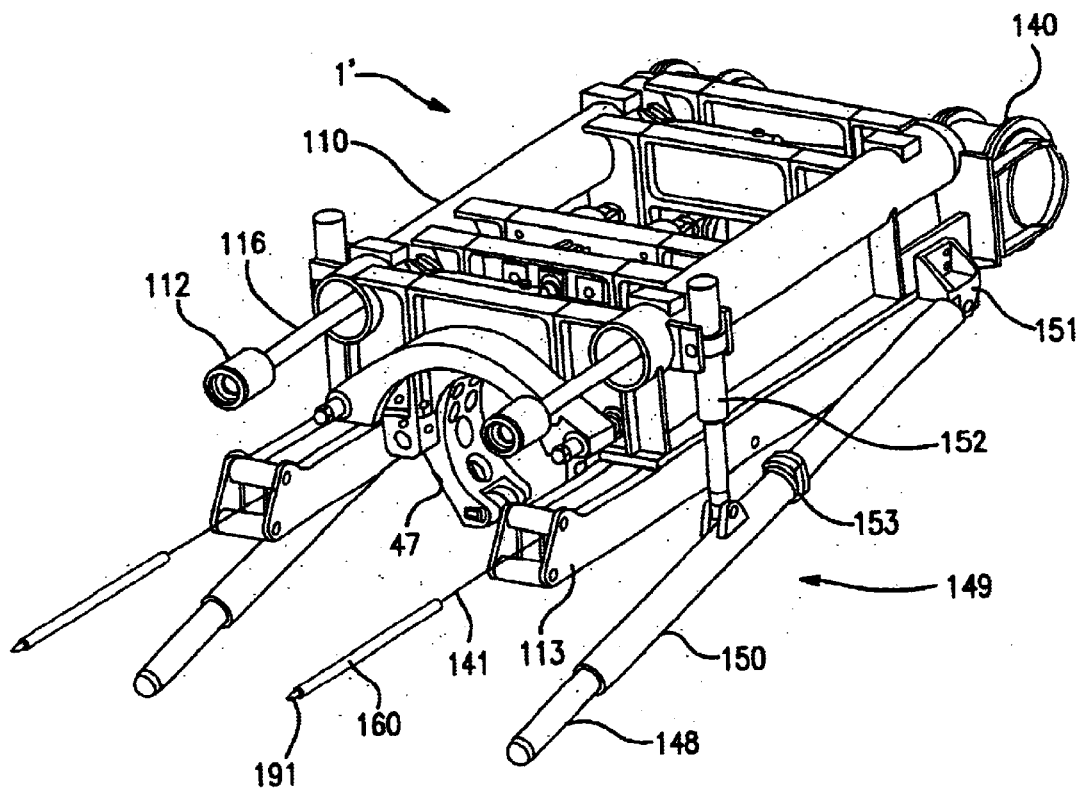
FIG. 5 is a perspective view of a second embodiment of the tool.

FIG. 5 illustrates a second embodiment of the invention. On the whole this is similar to that described with reference to FIGS. 1–4. The main difference is that the pull-in actuators are located in a different plane to the pull-in wires and an improved version of the moment arms.

On the rear end of the frame there are mounted winches 140 (corresponding to the winches 40 illustrated in FIGS. 1–4) with pull-in wires 141. The end of each wire 141 (or 41) is connected to a short, rigid bar 160 which is forcibly guided through a box-like frame part 113. The other end of the bar has a locking device 191 which is a sphere similar to the sphere 91 of locking device 18 and shown in FIG. 10. The wires are located in a horizontal plane which is the same as the first horizontal plane 120 (shown as 120' in FIG. 6; see also FIGS. 15–16). The sphere 191 of FIG. 5, as well as sphere 91 of FIG. 10, cooperate with sleeves 60, 61 which act as a first anchoring means.

The moment or support arms 149 comprise a first actuator with a cylinder 150, the rear end of which is attached to the frame by a rotating joint 151. A second vertically upright actuator is attached with its cylinder 152 to the side of the frame with the associated piston 153 attached to the cylinder 150.

Figure 15:
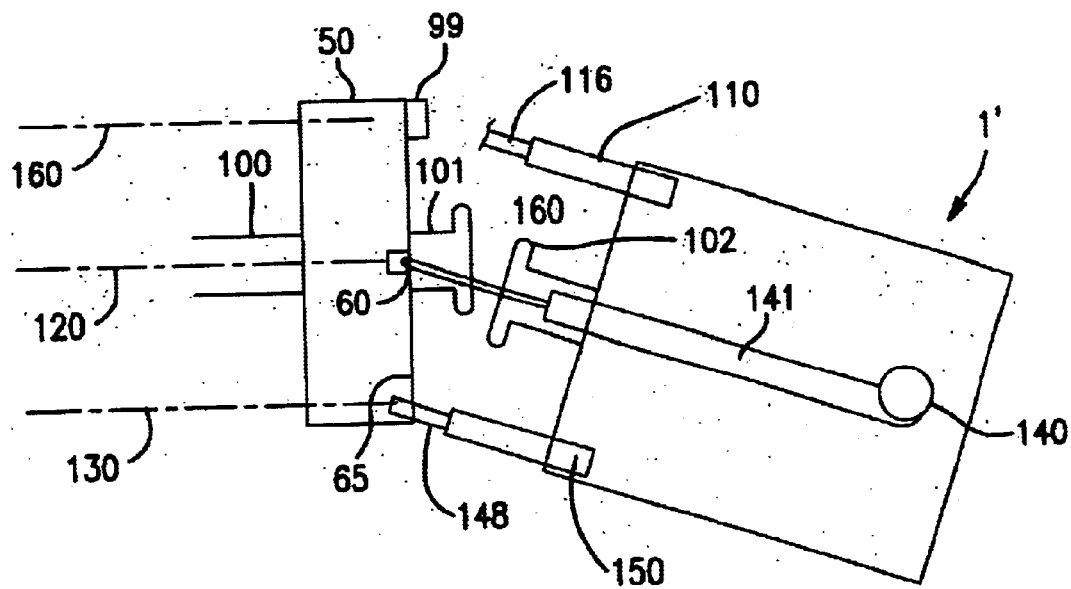
FIGS. 15–16 show two phases of the connection operation.
Figure 16:
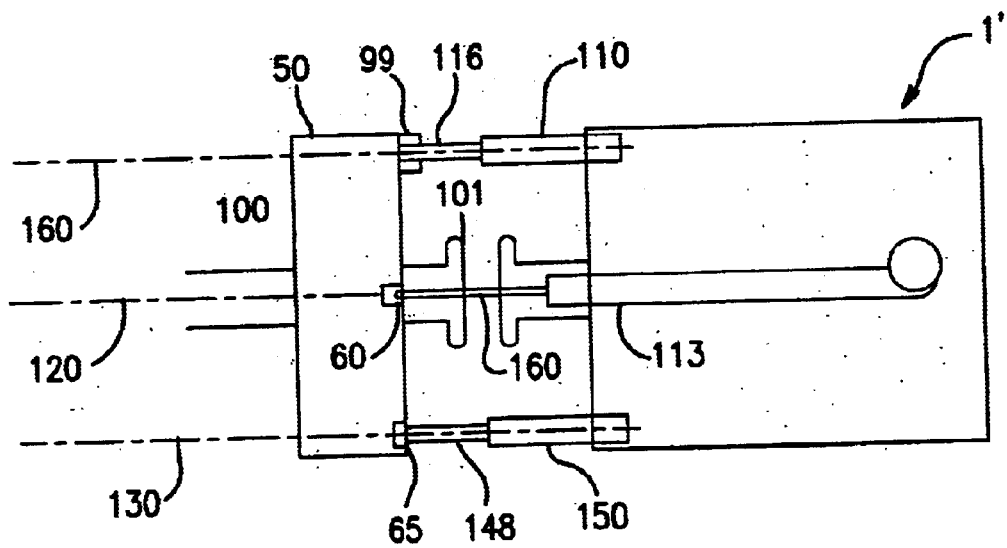

The alignment actuators 110 are rigidly attached to the frame and have pistons 116 which can be extended some distance in front of the tool. The ends of the pistons are equipped with locking means 112. These locking means are intended to be received in corresponding locking means (second anchoring means) mounted on the coupling head 100 or preferably on a collar 50 (FIG. 8), and in their simplest form may be a gripping device or a hook which can be suspended over the upper edge of the collar. FIGS. 15–16 illustrate two phases of the connection operation. In FIG. 15, the movable pipe is moved upwards towards the collar device 50, and in FIG. 16, the movable pipe is aligned with the stationary pipe and is ready for the connection.

In FIGS. 6–9 a collar device 50 is illustrated for use with the tool 1. The collar device consists of a strong frame 51 consisting of a front plate 53 and a rear plate 54. In the plates an opening 52 in the form of a U is cut out with the opening facing downwards. In the frame are mounted a pair of arms 54, 55 of a pipe gripping device. The arms are pivotable about rotating pins 56, 57 and are activated by hydraulic cylinders 58, 59, whose piston rods are linked to the respective arms 54, 55.

Figure 6:
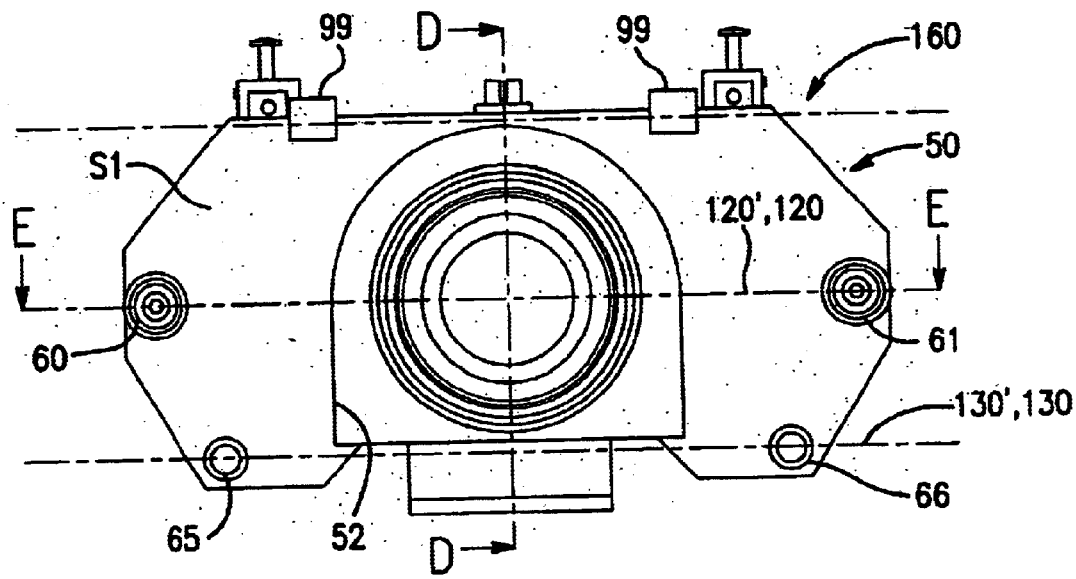
FIG. 6 is a front view of a collar device.
Figure 7:
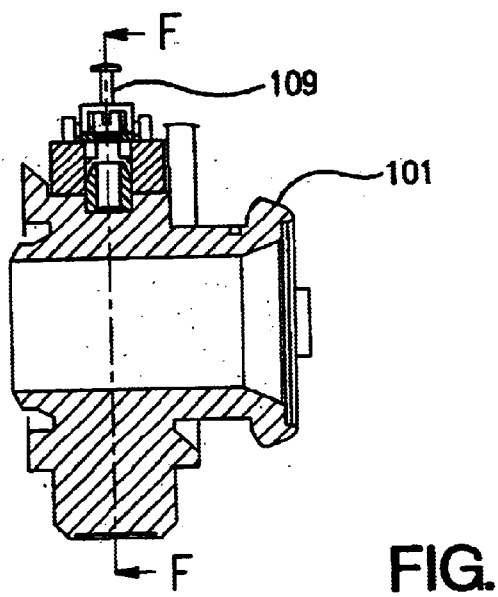
FIG. 7 is a section through line D—D in FIG. 6.
Figure 8:
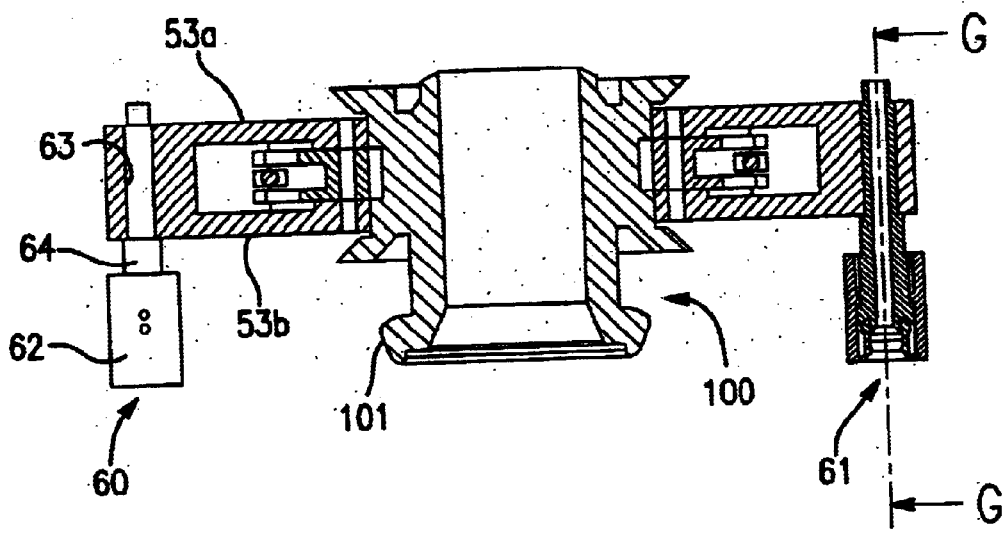
FIG. 8 is a section through line E—E in FIG. 6.
Figure 9:
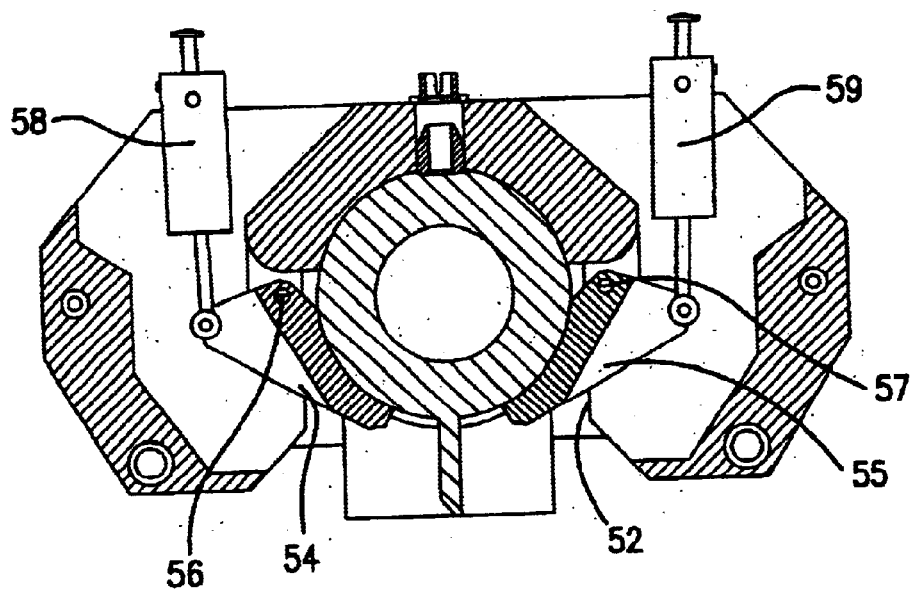
FIG. 9 is a section through line F—F in FIG. 7.
Figure 10:
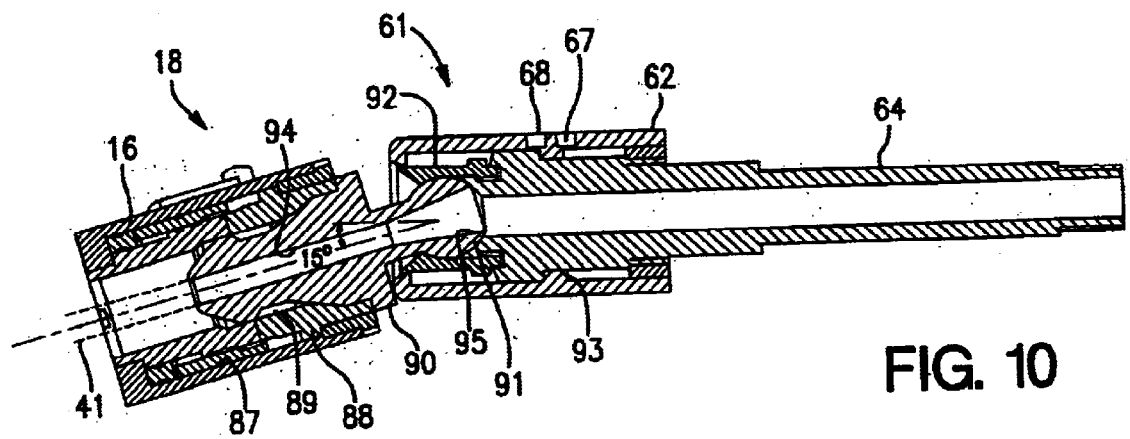
FIG. 10 is a section through a device for angular adjustment, along line G—G in FIG. 8, on a larger scale.

On each side of the U-opening 52 are mounted two connecting/securing sleeves 60, 61 (FIG. 8). On the right side of FIG. 8 and FIG. 10 the connecting sleeve 61 is illustrated cut away. Each connecting sleeve 60, 61 comprises a cylindrical part, such as a bar 64, which is attached in a hole 63 in the collar's frame and an outer sleeve 62, which is a locking sleeve arranged to act as a receiver of the wire's 41 locking device 18. The locking sleeve comprises hydraulic locking bodies for receiving and locking a locking ball 91 of the locking device 18 (FIG. 10). As illustrated in FIGS. 6 and 8 the connecting sleeves 60, 61 are placed symmetrically about the centre axis of the coupling head 100 and are located in a horizontal plane 120', which is coincident with the first horizontal plane 120 when the end of the pipe or the termination head 102 is aligned with the coupling head 100 (see FIG. 2).

In the collar device, similarly mounted symmetrically about the vertical centre line, but located in a second horizontal plane 130' at a distance from, and below, the first horizontal plane 120', there are mounted two receiving devices or stops 65, 66. These are intended to interact with the end of the support or moment arms 49 and 149 respectively, and are in addition equipped with means (not shown) for connecting and locking a support frame for a termination head 102, which will be described in greater detail below in connection with FIGS. 11–12.

The coupling head 100, i.e. the female part of the pipe connection, is, as illustrated in FIG. 8, designed with a double flange with intermediate grooves. This design ensures that the collar, which has to be placed over the coupling head, is guided in correctly, while at the same time the collars are capable of withstanding twisting movements in the horizontal plane.

The figures illustrate the collar when it is attached to and encloses the coupling head 100. As mentioned above, this may be the front end of a pipe, which is attached to a bottom or seabed structure and to which a pipeline has to be connected. As mentioned above, to the pipeline is attached a pipe or termination head 102 which comprises the second part of the connector.

The collar may be designed with a through-going hole 109 (FIGS. 7, 11, 12) for passing through a guide line.

As mentioned above, the coupling head may be an end of a pipeline which is placed on the seabed, or a side branch of a pipeline. Such a side branch may be a so-called tee joint or a pipe in a flowline bundle.

FIG. 10 illustrates an enlarged section along line G–G in FIG. 8, where the connecting sleeve 61 is illustrated with the end of the hollow rod 16 connected.

The end of the hollow rod 16 is provided with locking means for an adaptor or connecting adaptor 90. The rod's inner surface is preferably equipped with threads for screwing in a sleeve 87. A locking part 88 can slide axially inside the end portion of the rod 16. The locking part grips a number of dogs 89 which engage with a portion of the connecting adaptor 90, thus enabling it to be releasably secured in the end of the rod. The other end of the connecting adaptor 90 has a locking ball or a spherical surface 91. Through the adaptor there extends an axial passage 94 which has an extended portion 95 at the end of the ball.

The connecting sleeve 61 has an outer portion with an axially movable, outer sleeve 62 which acts as a locking sleeve for a coupling or connector where fingers 92 engage with and secure the locking ball 91 of the connecting adaptor 90. The sleeve 62 is moved by supplying hydraulic fluid through ports 67, 68 to respective sides of a hydraulic piston 93.

The fingers 92 engage with the ball 91 in such a manner that the connecting adaptor 90 is rotatable about three axes. The adaptor 90, and thereby the hollow rod 16, can thereby be rotated relative to the axis of the connecting sleeve 61, even when the fingers 92 are enclosing the ball 91, i.e. when the connector is locked.

The lockable adaptor 90 forms the locking device 18 when it is used together with the wire 41, thus permitting the wire 41 to be secured to the collar 50 during pull-in, which process will be explained in more detail below.

As illustrated in FIG. 3, the line or the wire 41 runs from the winch 40, via the pulley 42 and through the hollow rod 16 to the ball 91. In the ball's enlarged portion 95, the line or wire 41 is split up in the known manner and attached by means of a conical plug (not shown).

In an emergency the adaptor can be disconnected by means of the ROV's manipulator arms (not shown), whereupon the line can be cut if the operation has to be interrupted before the connection is completed and the ball cannot be released from the connector 92.

In the alternative embodiments the locking device 18 consists only of the ball surface 91, the surface being machined directly from a bar, either on the end of the actuator rod 16, which has to be pulled in without the use of wires, or a rod which is required to be employed together with the wire in the embodiment according to FIG. 5. In this way the parts can be standardised as much as possible, for example the same design of the collar 50 may be used in all the alternatives.

When connecting spool pieces (spools) it is advantageous to be able to position or locate the spool pieces directly on the installation, thus avoiding the need to rotate the ends of the pipes or to place or locate the ends of the pipes beside the installation and to pull them in for connection in the same way as that described above.

Figure 11:
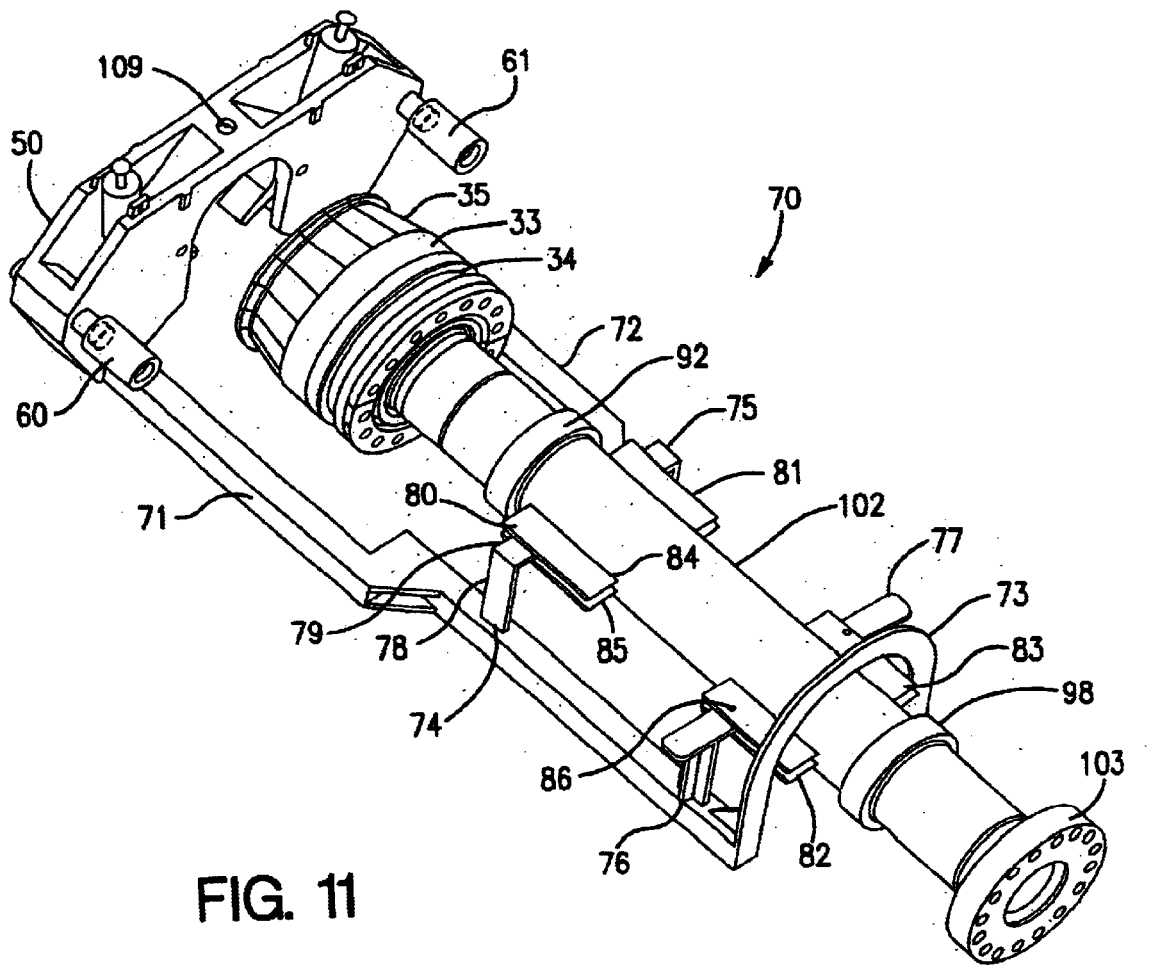
FIG. 11 is a perspective view of a collar with an adaptor for spool pieces.

FIG. 11 illustrates a first embodiment of a support frame 70 for use in such operations. The support frame consists of two frame parts, preferably beams 71, 72. The front end of the beams is attached to the collar device 50, the ends of the beams being adapted to the receiving devices 65, 66. At the back the beams are connected to a bridge 73 for the desired rigidity. On the frame, vertical angles or hooks 74, 75 and 76, 77 respectively are mounted in pairs wherein the hooks are facing each other at mutual distance. Each hook consists of a vertically upstanding piece 78 which is welded to the beam, with an upper horizontally located flange 79.

Figure 14:
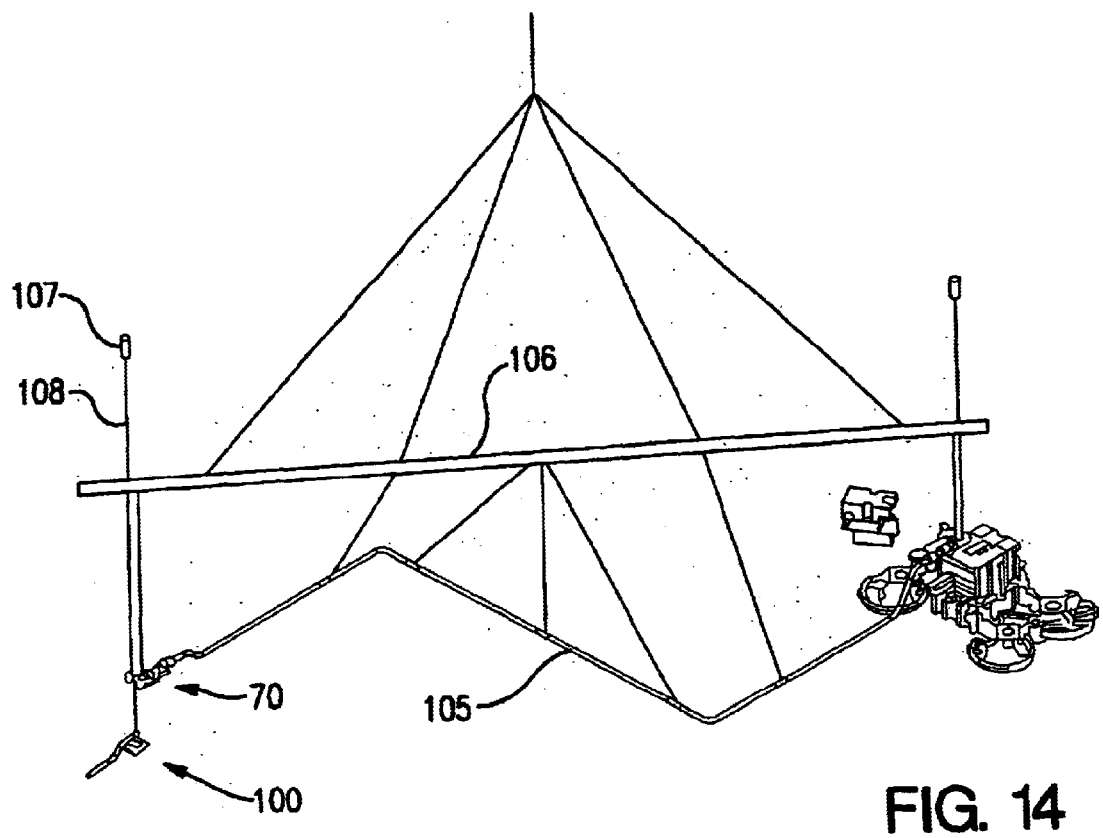

FIG. 11 illustrates how a termination head 102 is attached in the support frame 70. At its rear end the termination head has a connector 103, for example a flange as illustrated in the figure, for connection to the front part of a pipeline 105 (FIG. 14). On the termination head are mounted two ribs 97, 98 which form gripping points for the pipe grippers or fingers 35.

On the termination head two horizontally projecting locking parts 80, 81 and 82, 83 respectively are attached in pairs at intervals. Each locking part consists of two plates 84, 85 mounted at a distance apart approximately corresponding to the thickness of the flange 79, thus enabling the flange 79 to slide between the two plates 80, 81. The locking parts are located in a horizontal plane which intersects the centre axis of the termination head, i.e. the plane 120.

In order to hold the parts together, use may advantageously be made of locking means, for example releasable locking pins 86 mounted in the locking parts 76, 82 which hold the two parts together during lowering to the seabed.

As illustrated in FIG. 11, the termination head 102 can thereby be slidably secured in the support frame 70 (when the locking pins 86 have been released), the interacting locking parts (for example 74, 80) providing an enforced or controlled guidance and thus causing the termination head to be correctly axially aligned relative to the coupling head 100.

Figure 12:
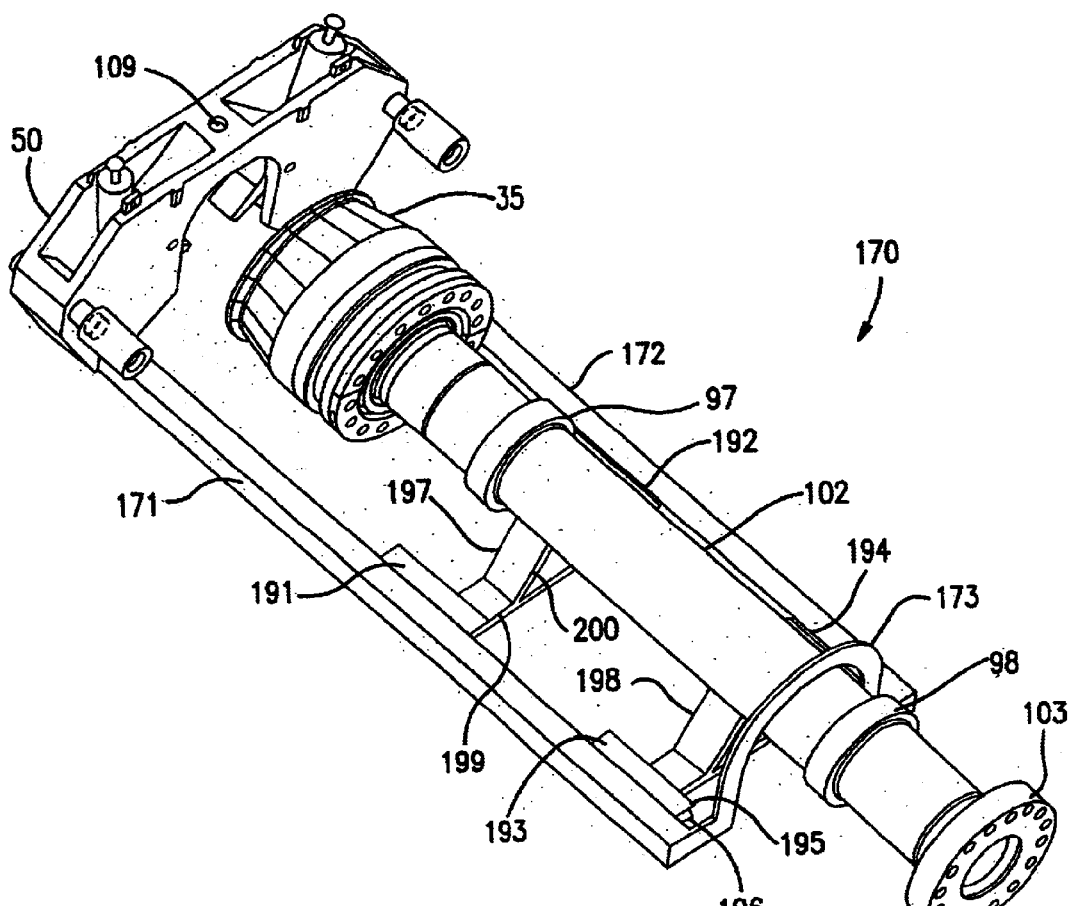
FIG. 12 is a perspective view of a collar with a second embodiment of the adaptor.

In FIG. 12 a second embodiment of the support frame, designated by 170, is illustrated. (Identical parts have been given the same reference numerals with the addition of 100). This consists of frame parts, preferably beams 171, 172.

The front end of the beams is attached to the collar device 50 in the receiving devices 65, 66. At the back the beams are connected by a bridge 173.

On the inside of the beams, locking parts 191, 192 and 193, 194 respectively are mounted in pairs and at intervals and facing each other. Each locking part consists of two plates 195, 196 mounted at intervals. The locking parts are located in the same horizontal plane as the beams.

On the termination head two stays 197, 198 are attached in pairs at intervals. Each stay comprises a horizontal flat iron 199 which is secured by brackets 200 attached to the termination head 102. The thickness of the flat iron corresponds approximately to the said spacing between the plates 195, 196, thus enabling the flat iron 199 to slide between the two plates. In the same way as FIG. 11, FIG. 12 illustrates a situation where a termination head 102 is fixed in the support frame 170.

Releasable locking pins (not shown) are provided to secure the two locking parts.

A description will now be given of the method of connecting a flowline or an umbilical to a seabed installation by means of the tool as illustrated in FIGS. 1–5.

As previously mentioned, a pipeline is deployed in advance from a special vessel, and placed on the seabed with the termination head 102 at a relatively short distance from the installation.

On a vessel on the surface the tool is prepared by the collar 50 and the tool 1 being connected. To undertake this task, the ends of the respective wires 41 are inserted in their respective connectors 60, 61 and the locking fingers 92 are activated to grip the balls 91. The second actuator 20 is completely withdrawn, while the moment arms 49 advantageously rest against the stops 65, 66.

Figure 13:
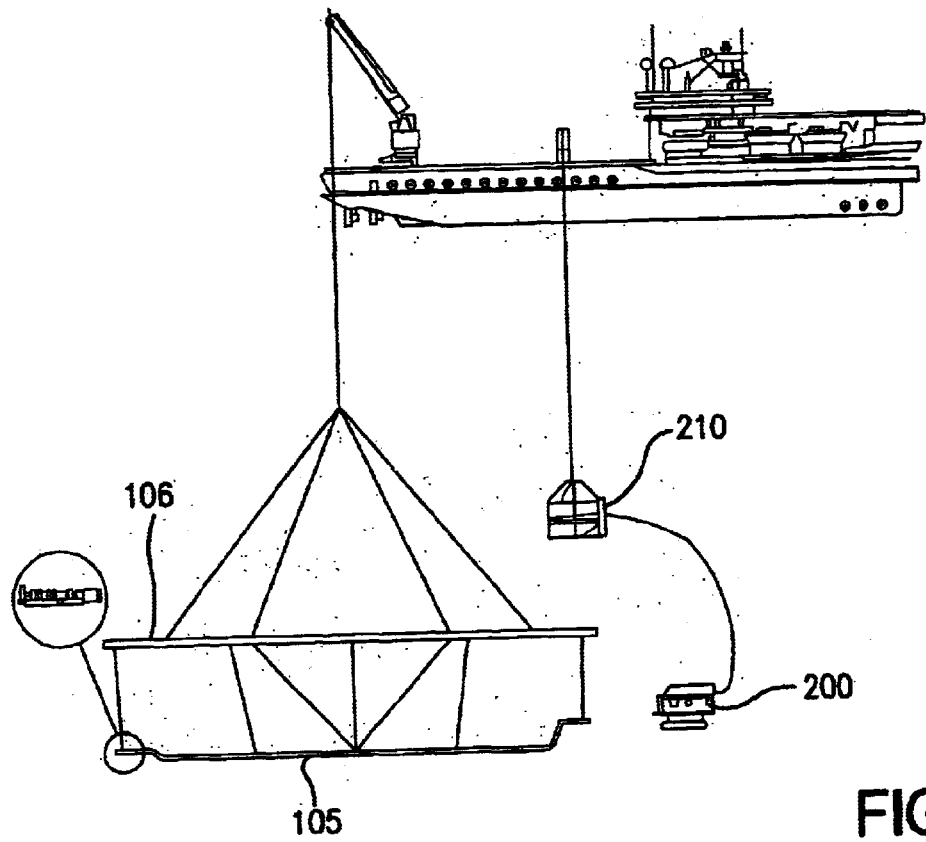
FIGS. 13–14 are schematic views of the steps in the method for connection of a rigid spool piece.

The entire tool is now lowered to the seabed by advantageously being located on a working platform (210 in FIG. 13), or attached to a ROV (200). The ROV is lowered to the seabed and may be guided over to the platform for connection with the tool 1.

The ROV is now guided over to the bottom installation, where the pipe termination with the fixed coupling head 100 is located. The collar is now placed over the coupling head and the cylinders 58, 59 started in order to pivot the arms 54, 55 in order to engage firmly round the coupling head 100. The special design of the coupling head (see FIG. 7) will contribute towards a correct positioning guidance in or of the collar.

The next step is to release the adaptor 90 from the connector 89 in the hollow rod 16. The line is thereby secured in the collar by the end of the ball 91 (with fixing or anchoring point for the line 41) of the adaptor 90 being secured in the connector 92. The ROV now moves over to the pre-deployed pipeline, the winches being started in order to simultaneously pay out line, and is brought to <<sit>> over the termination head 102. The cylinders 48 are activated in order to pivot the arms 46 to engage round the termination head, preferably by gripping round the area 97, 98. When a firm <<grip>> has been obtained round the termination head, the winches are started in order to pull in the line.

When the winches are operated, the tool with the termination head will be pulled in towards the coupling head on the installation. Since the coupling head is mounted at a distance above the seabed, usually of the order of 2–3 metres, the pipeline has to be raised from the seabed. The forces acting on the tool during the pull-in will normally be capable of lifting the pipeline from the seabed. When the tool begins to approach the coupling head, it will therefore assume an angle relative to the horizontal. This angle must be corrected before the final coupling can take place.

During this phase the pistons 13, 14 are completely retracted in the cylinders 11, 12, i.e. the hollow rods 16 are located at a distance in front of the tool. When the tool thereby approaches the collar, the front end of the rods 16 will be guided towards the connectors 60, 61. The line 41 will guide the rod 16, thus causing the adaptor 90 to be guided into the end of the rod and enabling it to be locked thereto by means of the locking mechanism 88, 89.

If the pipeline is pulled in obliquely in the horizontal plane relative to the coupling head, the winches can operate independently of each other to correct this slanting position.

When the termination head approaches the coupling head during the pull-in procedure, the moment arms 49 (FIG. 3, or 149 FIG. 5) will also meet the stops 65, 66 (FIG. 6) on the front of the collar 50. The distance between the two planes (the pull-in plane 120 and the moment arm plane 130) will provide a moment arm which, when the actuators 11, 12 are now started in order to push out the pistons 13, 14, thereby pulling in the rod 16, will cause the termination head 102 to be straightened up into an approximately horizontal position and become axially aligned with the coupling head.

When the rod 16 is connected to the collar 50 as described above, the pull-in force is greater since the actuators 10 provide greater force than the winches 40.

The fact that the connectors 60, 61 enclose the balls 91 causes the tie-in to be rigid and capable of transferring the pull-in forces, while still being capable of adjusting for the angular difference between the parts.

When the termination head is completely aligned with the coupling head, the locking actuators 21 are started in order to provide the final coupling. The locking sleeve 33 will hereby be pushed forwards, thereby forcing the fingers 35 into engagement round the coupling head 100.

The tool is released from the connector by releasing the arms 54, 55 from the collar 50. On account of the releasable attachment of the bar 31 to the crossheads 29, 30 (and possibly the parts 31, 34), the tool 1 can now be released from the termination head by moving vertically upwards.

The tool can now undertake another coupling or be brought back to the surface.

It should be noted that the ROV is also equipped with means for undertaking inspection and cleaning of the ends of the connector and possibly also for placing a seal 101 (FIGS. 1, 7, 8) in the termination head before the final tightening of the connector.

When using the tool 1' illustrated in FIG. 5, the collar 50 and the tool are connected in the same way as above by the ends of the wire rod (with balls 91) being inserted in their respective securing sleeves 60, 61 and the locking fingers 92 activated to lock round the ball 91. The second actuator 20 (the pull-in actuator) may advantageously also be connected to the collar, but this is not necessary since the winches may be used to provide a tractive force in the wire. The moment arms' 148 rods 149 rest against the stops 65, 66.

When the ROV has locked the collar 50 to the coupling head 100, no further operations are required before the ROV moves backwards towards the termination head.

The moment arms' 149 rods 148 are completely retracted, thus enabling the winch to pull the termination head closer to the installation, even with a large angle. When the tool approaches the coupling head during the pull-in operation, the wire rod will be guided into its box-like guide 113 for enforced or controlled guidance of the tool in towards the installation. The rods 148 abut against the stops 65, 66 and the distance will now be such that the pull-in actuators' 110 piston rod 116 will be able to be locked to the collar 50, possibly by the lock 112 being locked to a corresponding lock on the collar. When the termination head is aligned into a horizontal position, the interaction between the moment arms 149 and the actuator 110 will make it possible to align the termination head even against substantial forces. A substantial alignment force is obtained, both on account of the moment arms' force diagram and because the distance between the two horizontal planes, the moment arm plane and the plane of the actuators 110 is relatively great.

When the termination head is completely aligned with the coupling head, the locking actuators 21 are started in order to provide the final coupling. The locking sleeve 33 will hereby be pushed forwards, thereby forcing the fingers into engagement round the coupling head.

The tool is released from the connector by releasing the arms 54, 55 on the gripping device 50. On account of the releasable attachment of the rod 31 to the crossheads 29, 30 (possibly the parts 31, 34), the tool 1 can now be released from the termination head by moving vertically upwards.

The tool can now undertake another coupling or be brought back to the surface.

A method will now be described for connecting a spool piece or spool between two fixed installations on the seabed by means of the support frame 70 and 170 respectively.

A spool piece 105 is manufactured on a platform based on the measured distance between the two installations. Termination heads 102 are welded to each end of the spool piece. Support frames 70, 170 are then attached to the termination heads by means of the locking mechanisms 80, 81 and 191, 192 respectively, etc. Normally, guide lines with buoys will also be attached to the spool piece and passed through the holes 109. The completed spool piece is attached to a yoke or spreader beam 106 which is then lowered into the water by means of a crane, see FIG. 13. When the spool piece is located approximately 10 metres above the seabed, the lowering is stopped and the spool piece is rotated and aligned into the correct position above the two installations. The spool piece can now be lowered to the underwater installations in such a manner that the collars each land on their respective coupling heads 100.

For this operation guide lines 108 are preferably employed in order to ensure a safe landing on the underwater structure 100, as illustrated in FIG. 14. Guide lines, which during lowering are attached to the spool piece 105, are released and pulled down to the coupling head by means of the ROV 200 and attached there. A buoy 107 is also released from the spool piece, thus enabling it to rise up in order to create a tractive force in the line 108. The assembly is then lowered to the seabed to land with its ends on the bottom structures, in such a manner that the collars 50 each land with the U over its coupling head 100. The spreader beam can now be released and pulled up to the surface. The ROV now moves over to one end of the spool piece and attaches itself to the termination head. The frames 1a, 1b of the tool and the beams 71, 72, 171, 172 comprise rapid couplings, for example catch-type couplings (not shown), thus enabling the tool 1 to be releasably connected to the support frame 70, 170. When the arms 35 are started in order to be clamped round the pipe, the tool will be aligned with the support frame, thus securing the pipe in the area 97, 98 of the termination head. When the tool 1 has been connected to the termination head, the locking pins 86 can be broken to release the termination head from the support frame.

The actuators 10 are now started to extend the rods 16 until the end 18 (i.e. the ball 91) of the wire end (which is locked in the rods) comes into engagement with the locking sleeves 60, 61. The connectors are locked, whereupon the actuators 10 are again activated in order to move the rod 16 back. The tool 1 will thereby move towards the coupling head 100, bringing the termination head 102 along with it, since the latter is now attached to the tool. The locking actuators can then be activated in order to lock the connector as described above.

During this operation winches are not employed, and it will therefore be advantageous to replace the hollow rod 16 with a solid rod with its end shaped like the ball 91.

During this operation the termination head 102 has moved relative to the support frame 70 and 170 respectively. When the termination head has reached its front position, the hook 79 has therefore moved out of engagement with the flanges 84, 85. The tool is still attached to the support frame but the support frame is now released from the termination head and can be recovered to the surface together with the tool for subsequent use.

What is claimed is:

1. Apparatus for the remote connection of underwater conduits, comprising:
   a tool including
   means for connecting the tool to a first, movable conduit having a longitudinal axis,
   means for moving the tool relative to a second, stationary conduit, said means for moving the tool comprising
      at least one pull-in winch having a pull-in wire,
      at least one alignment and stroking hydraulic actuator having a piston rod,
      at least one moment arm, and
   means for locking the first and second conduits together in an end-to-end relationship,
   a collar device including
      gripping means for releasable attachment to the first conduit,
      first anchoring means for securing an end of the wire to the collar device,
      second anchoring means for securing the hydraulic actuator to the collar device, and
      at least one stop intended to interface with the moment arm,
   wherein the first anchoring means and the longitudinal axis of the first conduit are located in a first horizontal plane,
   the stop is located in a second horizontal plane,
   the second anchoring means are located in a third horizontal plane, the second horizontal plane being located below the first horizontal plane and the third horizontal plane being located above the first horizontal plane.

2. The apparatus according to claim 1, wherein the moment arm is hinged to a frame of the tool for swinging around a hinge axis, the tool comprising a swinging actuator for swinging the moment arm around the hinge axis.

3. The apparatus according to claim 1, wherein the second anchoring means comprises a connector.

4. The apparatus according to claim 3, wherein the second anchoring means comprises a hinged element.

5. The apparatus according to claim 4, wherein said hinged element comprises a spherical ball.

6. The apparatus according to claim 5, wherein the second anchoring means comprises a connector which is coupled to the spherical ball.

7. The apparatus according to claim 1, wherein the piston rod comprises a gripping means, for connection with the collar device.

8. The apparatus according to claim 1, wherein the stop comprises locking means for connection of a support frame.

9. The apparatus according to claim 8, wherein the support frame comprises attachment means for releasable connection of the support frame with the first conduit.

10. The apparatus according to claim 8, wherein the support frame comprises means for releasable connection with the tool.

11. The apparatus according to claim 1, wherein the tool can be connected to a remotely controlled vehicle (ROV).

12. The apparatus according to claim 1, wherein the length of the moment arm is variable.

* * * * *